April 10, 1945.                    C. HAUMILLER                    2,373,472
                              ROTARY CUTTER STRUCTURE
                      Filed Jan. 24, 1944                2 Sheets-Sheet 1
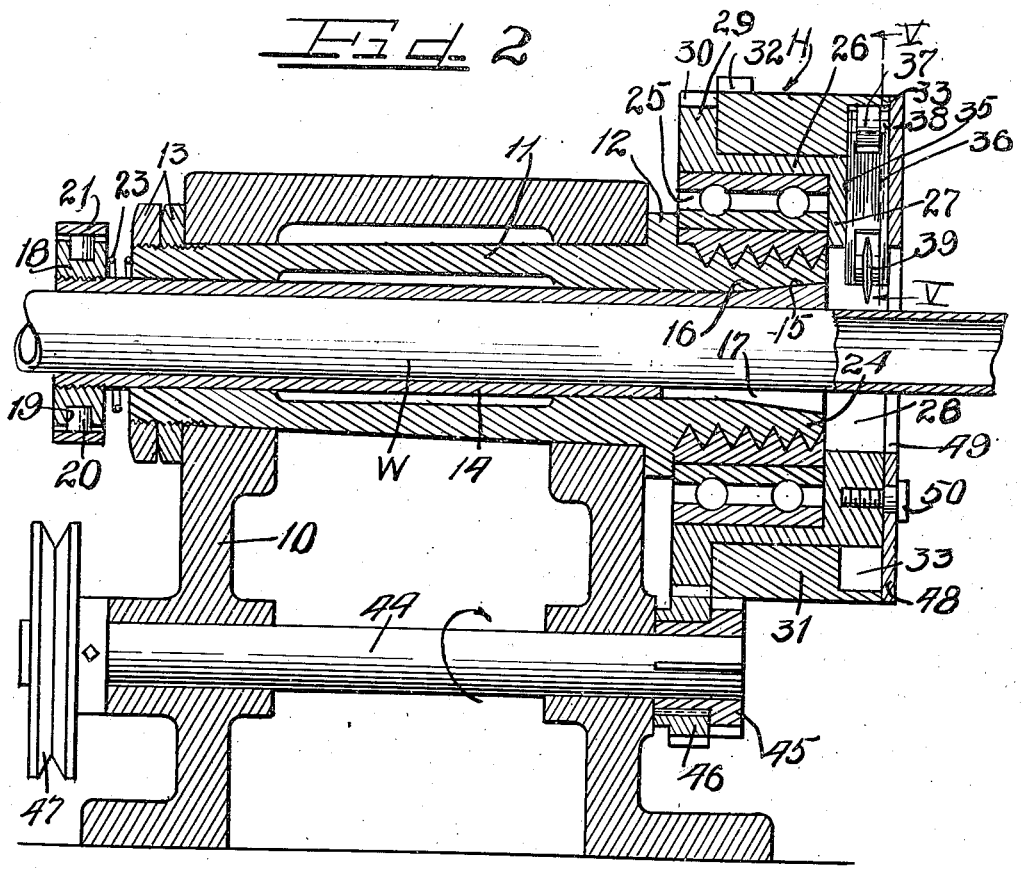
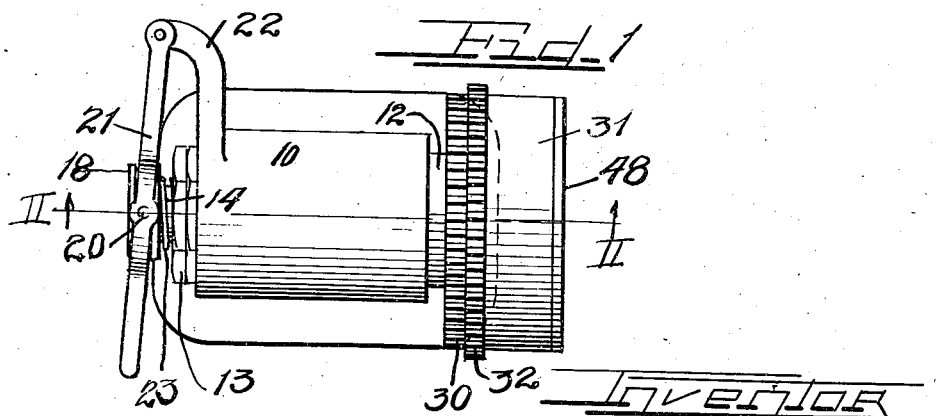

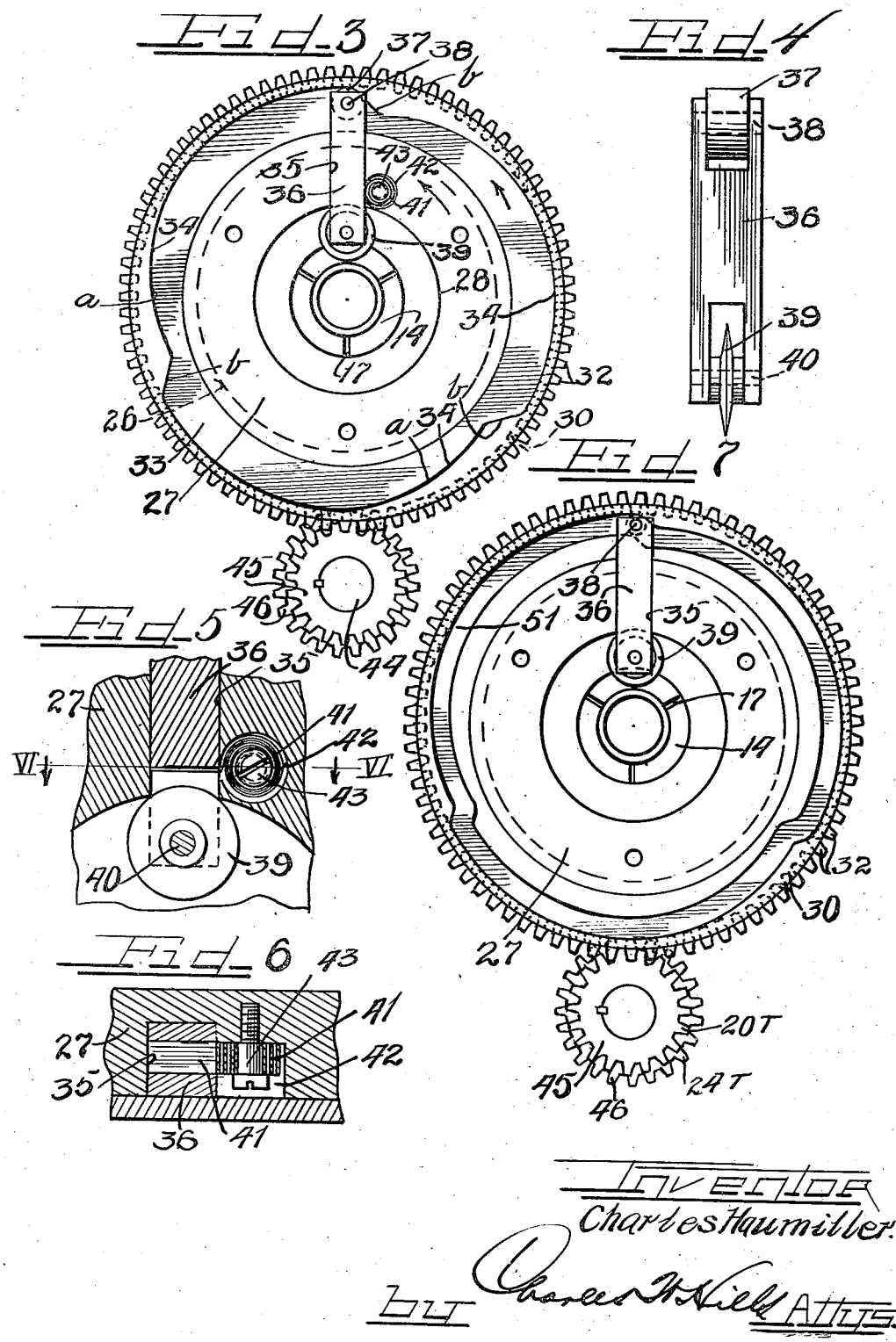

Patented Apr. 10, 1945

2,373,472

UNITED STATES PATENT OFFICE 2,373,472

ROTARY CUTTER STRUCTURE

Charles Haumiller, Elgin, Ill.

Application January 24, 1944, Serial No. 519,573

3 Claims. (Cl. 164—60)

My invention relates to a rotary work performing structure and more particularly to one which is adapted for cutting pipe, tubing, bars or the like.

Among the more important objects of the invention are to provide improved supporting structure for the rotatable cutting head; to provide an improved arrangement for the cutting tool supporting ring and the cam ring for setting the cutting tool; to simplify the construction of the cutter head parts so that they may be more readily assembled; to provide improved means for feeding piping, tubing or bars to be cut; and in general to produce a more simple cutter structure of the type referred to which can be economically manufactured and which will accurately and efficiently effect the cutting.

The various features of my invention are embodied in the structure shown on the drawings in which:

Figure 1 is a plan view of a cutter structure;

Figure 2 is an enlarged section on plane II—II of Figure 1;

Figure 3 is an end view of the cutter head and driving gears therefor, with the cover plate removed;

Figure 4 is an enlarged side elevation of the cutting tool;

Figure 5 is an enlarged section on plan X—X, Figure 2;

Figure 6 is a section on plan VI—VI of Figure 5; and

Figure 7 is a view similar to Figure 3 showing a modified form of cam ring.

Referring to Figures 1 and 2, a supporting frame 10 has a spindle 11 extending therethrough provided with an annular shoulder 12 near its outer end for engaging the outer side of the frame, nuts 13 engaging the threaded outer end of the spindle to abut the frame to clamp the spindle thereto. Movable longitudinally within the bore of the spindle is a chuck tube 14 whose outer portion has the frusto-conical surface 15 for cooperation with the frusto-conical surface 16 of the outer end of the spindle bore, the outer portion of the chuck tube having longitudinally extending slots 17. The work W, shown in the form of a tube, is inserted through the chuck tube to be securely held while it is being cut. A collar 18 secured to the inner end of the chuck tube has the circumferential channel 19 for receiving the pins 20 extending from a lever 21 fulcrumed to the end of a bracket 22 extending from the frame 10. When the lever is swung outwardly, the resulting tension on the chuck tube will cause camming engagement of the frusto-conical surface 15 of the chuck tube with the surface 16 of the spindle and the outer end of the chuck tube will then be securely clamped to the spindle and the work. This clamping engagement may be maintained by holding the lever 21 swung out, or a spring 23 may be inserted between the collar 19 and the end of the spindle 11 to hold the chuck tube in to maintain attaching engagement with the hub with the work when the lever 21 is released. After a cutting operation, the lever 21 is swung to shift the chuck tube out to release its clamping engagement with the work so that the work can be fed out for the next cutting operation. The end of the spindle 11 outside of the annular shoulder 12 thereon is threaded to receive a bushing 24 which abuts the shoulder. This bushing mounts the inner ring of a ball bearing assembly 25 whose outer ring receives the cutter supporting ring 26 of the cutter head H. At its outer end this cutter ring has the annular flange 27 which extends radially inwardly in front of the bushing 24 and which provides the passageway 28 through which the work W may be extended. At its inner end the cutter ring 26 has the radially outwardly extending flange 29 having the external gear teeth 30 thereon.

Rotatably mounted on the cutter ring 26 is a cam ring 31 which at its inner end abuts the gear flange 29 on the cutter ring. The cam ring extends outwardly with its outer face flush with the outer face of the cutter ring flange 27. The cam ring is of slightly greater external diameter than the gear flange 29 and its inner end has the gear teeth 32.

In the outer end of the cam ring is the channel 33 which surrounds the flange 27 of the cutter ring and provides a series of cam surfaces 34 on its inner side, Figure 3 showing three such cam surfaces. The cutter ring flange 27 has a radially extending slot 35 in its outer side for receiving the cutting tool holder 36. This holder is of rectangular cross-section and at its outer end is bifurcated to receive a cam roller 37 journalled on a pin 38. At its inner end the holder is bifurcated to receive a cutter wheel 39 journalled on the pin 40. The outer end of the cutter holder projects into the channel 33 for engagement of the cam roller 37 with the cam surfaces 34. In the arrangement shown on Figures 3, 5 and 6, a spring 41 tends to hold the holder out with its cam roller against the cam surface. The spring shown is a coil spring within a recess 42 adjacent to the slot 35, the spring surrounding and being anchored at one end to the shank of a screw 43, the free end of the spring engaging against the holder between the bifurcation arms thereof, as shown on Figures 5 and 6.

Referring to Figure 2, a drive shaft 44 is journalled in the supporting frame 10 below the spindle 11 and has keyed to its outer end a gear pinion 45 meshing the teeth 32 on the cam ring 31. The gear pinion 46 is geared on the hub of the gear pinion 45 and meshes with the teeth 30 on the cutter ring 26. The shaft 44 may be turned by hand or by a belt (not shown) engaging the pulley 47 secured to the inner end of the shaft. The shaft 44 is rotated for counter-clockwise rotation of the cutter ring and cam ring, and with the gearing arrangement shown, the cutter ring will rotate slightly faster than the gear ring. The gearing arrangement may be such that, after one revolution of the rings, the cutter ring will be a distance of two teeth ahead of the cam ring. It will thus require a number of revolutions for passage of the cam roller on the cutter holder along the full length of one of the cam surfaces 34. Referring to Figure 3, the cam roller is at the starting end of one of the cam surfaces. For a considerable distance along the cam surface, about one-half the distance as shown on Figure 3, the cam surface is idle as during such extent its radius from the axis of the cam ring remains the same. However, the portion a of the cam surface is of gradually decreasing radius and at its end b the radius rapidly increases. Thus, during the differential rotation of the rings, the cutter structure 36 will be held out a while until the cam roller engages with the part a of the cam surface and then the cutter will be shifted radially inwardly for application of its cutting wheel 39 to the work W for the cutting operation. After the cutting operation, when the cam roller reaches the end b of the cam surface, the cutter will be shifted out away from the work by the spring 41 for engagement of the cam roller with the end of the next cam surface. During the period of engagement of the cam roller with the idle portion of a cam surface, the operator will have time to operate the chuck tube 14 for advancement of the work W and reclamping thereof for the next cut.

Although I have shown only one cutter, more could be employed. For example, where there are three cam surfaces on the cam ring, three cutters could be mounted on the cutter ring spaced 120 degrees apart. The cutters are held in the slots 35 by an end plate 48 covering the outer ends of the slots and extending across the cam channel 33 and having the passageway 49 in alignment with the passageway 28 of the cutter ring flange 27. The plate is detachably secured to the flange 27 as by screws 50. When the plate is secured in place, it will hold the cutter or cutters 36 in their slots and will also hold the cam ring in place on the cutter ring and the spring 41 in its recess 42. The plate serves also to seal the cam channel 33 and the slots 35 and spring recess against dirt or dust.

With the inner and outer flanges on the cutter ring integral therewith, thus forming an integral cutter ring, and with the slot in the outer flange for the cutter body which through its cam roller abuts at its outer end against the cam surfaces in the cam ring, the cam pressure is directly radially inwardly against the cutter body and the cutter tool so that the cutter structure will not be subjected to lateral strain in the guide slot in the integral cutter ring, and the end plate 48 which holds cutter structure in the slot will not be subjected to lateral strain.

In the modified arrangement shown by Figure 7 cam-ways or channels 51 are provided whose opposite parallel surfaces engage the cam roller of the cutting tool thus making unnecessary the application of spring means for holding the cutter 36 outwardly.

I have thus produced a simple economically manufactured and efficient cutter structure, but I do not desire to be limited to the exact construction and arrangement shown and described as changes in modification may be made without departing from the scope of the invention.

I claim as follows:

1. A rotary cutter structure for the purpose described comprising a hollow support through which the article to be cut is fed, a cutter ring journaled on the end of said support and having a radially outwardly extending flange at its inner end provided with gear teeth, said cutter ring at its outer end having a radially inwardly extending annular flange integral therewith and provided with a radial slot in its outer side, a tool holder movable in said slot and having a cam roller at its outer end and a cutting tool at its inner end, a cam ring journaled on said cutter ring and having a cam channel in its outer end surrounding the outer flange of said cutter ring, said cam channel presenting cam surfaces for engagement by said roller to effect radial shift of said tool holder during differential rotation of said rings, said cam ring at its inner end having gear teeth thereon, gears engaging the teeth on said cutter ring and cam ring respectively for differential rotation of said rings, and an annular plate detachably secured against the outer end of the outer flange of said cutter ring and engaging the outer end of said cam ring for closing the outer side of said cam channel and for holding said cam ring positioned on said cutter ring between the plate and the inner flange of said cutter ring.

2. A rotary cutter for the purpose described comprising a hollow support through which work to be cut may be fed, a cutter ring having an outwardly extending radial flange at its inner end and an inwardly extending radial flange at its outer end integral therewith, said outer flange having a radially extending slot therein, a tool holder movable in said slot and having a cam roller at its outer end and a cutter tool at its inner end, a cam ring surrounding and journaled on said cutter ring and having a channel at its outer end surrounding said outer flange on the cutter ring and presenting cam surfaces for engagement by said roller to effect radial shift of said tool holder during differential rotation of said rings, means for effecting such differential rotation, a circular recess in the outer side of the outer flange of said cutter ring, a spiral spring within said recess anchored at one end to said outer flange and having its other end extended into said slot against said tool holder tending to shift said tool holder outwardly for engagement of the cam roller with the cam surfaces, and an annular plate detachably secured against the outer face of said outer flange for closing the outer side of said tool holder slot and said cam channel and said spring recess and for holding said cam ring against axial displacement between the plate and the cutter ring inner flange.

3. A rotary cutter structure for the purpose described comprising a stationary hollow spindle through which work to be cut may be fed, the outer end of said spindle being screw threaded, a supporting ring detachably screw threaded on said threaded end of the spindle, the inner race of a ball bearing mounted on said supporting ring, a cutter ring receiving the outer race of said ball bearing and having an outwardly extending radial flange at its inner end integral therewith and at its outer end having a radially inwardly extending flange integral therewith and engaging said support ring to hold said ball bearing aligned thereon, said outer flange having a radially extending slot in its outer side, a tool holder movable in said slot and terminating at its inner end in a cutting tool, a cam ring receiving and rotatable on said cutter ring and having an annular channel at its outer side presenting cam surfaces, a recess in the outer side of said outer flange and a spring therein engaging said tool holder for shifting it outwardly for engagement of its outer end with said cam surfaces, an annular plate detachably secured against the outer face of said outer flange to form a closure for the outer side of said slot and said cam channel and spring recess and engaging the outer end of said cam ring to hold it in alignment between said plate and said inner flange on the cutter ring, and means for effecting differential rotation of said rings for inward shift of said tool holder by said cam surfaces for application of the tool to the work to be cut.

CHAS. HAUMILLER.